United States Patent [19]

Gutknecht

[11] Patent Number: 4,754,658

[45] Date of Patent: Jul. 5, 1988

[54] REEL MOUNTING APPARATUS

[76] Inventor: Leroy H. Gutknecht, 2607 S. Highland, Las Vegas, Nev. 89109

[21] Appl. No.: 917,205

[22] Filed: Oct. 9, 1986

[51] Int. Cl.[4] .......................... A63F 5/04; F16H 13/10

[52] U.S. Cl. ........................................ 74/207; 74/215; 273/143 R

[58] Field of Search ................. 74/206, 207, 209, 215; 273/143 R; 172/39; 366/233

[56] References Cited

U.S. PATENT DOCUMENTS

| | | | |
|---|---|---|---|
| 633,130 | 9/1899 | Feeny | 74/206 |
| 700,647 | 5/1902 | Hartness | 74/207 |
| 820,021 | 5/1906 | Smith | 74/206 |
| 1,399,329 | 12/1921 | Vandercook | 74/206 |
| 1,870,421 | 8/1932 | Prout | 74/209 |
| 2,097,071 | 10/1937 | Lichten | 74/209 |
| 2,514,701 | 7/1950 | Landberg et al. | 74/206 |
| 2,554,942 | 5/1951 | Dobrowsky | 273/143 R |
| 2,566,674 | 9/1951 | Odenthal | 74/206 |
| 3,633,432 | 1/1972 | Horsey | 474/181 |
| 3,650,535 | 3/1972 | Ohki | 273/143 R |
| 4,229,138 | 10/1980 | Hurst | 366/233 |
| 4,262,906 | 4/1981 | Heywood | 273/143 R |
| 4,271,714 | 6/1981 | Schmidt | 74/209 |
| 4,281,936 | 8/1981 | Schotter et al. | 366/233 |

*Primary Examiner*—Lawrence J. Staab
*Attorney, Agent, or Firm*—Jack C. Munro

[57] ABSTRACT

A reel mounting apparatus for a gaming device or other similar type of device wherein there are utilized a plurality of freely rotatable reels. Each reel is mounted in close proximity to each other reel. The periphery of each reel connects with a series of supporting wheels with there being a separate set of supporting wheels for each reel. One of the wheels, termed a driving wheel, is connected to a motor, which when activated, caused rotation of the reel. The driving wheel and one of the remaining supporting wheels are spring biased into firm contact with the reel.

6 Claims, 3 Drawing Sheets

REEL MOUNTING APPARATUS

BACKGROUND OF THE INVENTION

The field of this invention relates to a mounting apparatus for a rotatable reel and more particularly to reels which are used in gaming devices wherein the reels are rotatably driven for a certain period of time and then stopped with the reels then displaying a certain type of observable indicia through a window associated with the reels.

It is to be understood that the subject matter of this invention will be discussed primarily in conjunction with a gaming device which is frequently referred to as a "slot machine". However, it is considered to be within the scope of this invention that the structure could be readily used in any other environment. It is not intended that the structure of this invention be restricted to the use within the environment of gaming devices.

Gaming devices such as "slot machines" have long been known and are in widespread usage within certain States, certain Countries and certain Cities of the world. The common form of such a gaming device is utilized as a housing within which is mounted a plurality of rotating reels. Mounted on the periphery of each reel is certain type of indicia arranged in a particular pattern. Common type of indicia would be representations of different cards of a deck of cards with the reels containing the suits of "Diamonds", "Clubs", "Hearts" and "Spades". At other times, these reels would include other types of indicia such as representations of fruits (oranges, plums, lemons, cherries, etc.).

These reels are mounted within a housing and each reel is designed to be rotatably driven and sequentially randomly stopped. The housing includes a window which is aligned with a longitudinal segment of the reels. Through this window one can observe an aligned sequence of the indicia located on the reels.

In the past, it has been common to activate the gaming device through manual operation of a lever. In more recent times, activation of the gaming device occurs electrically with this electrical activation either occurring by movement of a lever or through a button.

Some gaming devices of the past have included three reels while others included four and still others included five reels. Generally, it has been found that customers tend to prefer the greater number of reels in a gaming device. In the past, the greater number of wheels, the wider the housing of the gaming device. The common housing width of a five reel gaming device would be at least twenty-one inches. It has been found that gaming devices can be constructed to be only seventeen inches in width with that being a sufficient distance between the next adjacent gaming device to provide adequate room for the customers using the devices. Within a single large room of a casino there may be literally thousands of such gaming devices. If all of the gaming devices were of only seventeen inches in width, as opposed to twenty-one inches of width, there could be a substantially increased number of the gaming devices located within the single room. This is of a particular economical advantage. However, prior to the present invention it has not been possible to construct a gaming device with five in number of reels and have that gaming device to be only seventeen inches in width.

SUMMARY OF THE INVENTION

The present invention constitutes a frame which is to be mounted within a housing such as an outer housing for a "slot machine". The frame includes an internal compartment within which is mounted a plurality of driving wheels and a plurality of idler wheels. The driving wheels and the idler wheels are spaced apart with a driving wheel and two in number of idler wheels being designed to be located within the same vertical plane. Within that vertical plane is located a reel. There is to be included a plurality of reels within the frame. The reels are located in juxtaposition to each other. Each reel is supported totally by two in number of the idler wheels and a driving wheel. There is mounted a motor in conjunction with each driving wheel. The output shaft of each motor may be spring biased to maintain secure driving contact within its respective driving wheel. At least one of the idler wheels mounted in conjunction with each reel is also spring biased into firm contact with its respective reel. Each idler wheel may comprise only a single wheel member or could comprise two in number of wheel members connected together through a connecting shaft. The driving wheel could also comprise two separate driving wheel members or could comprise a single driving wheel member. In the case of a single driving wheel member and a single idler wheel member, these wheel members include an annular channel within which is to rest the rim of the reel that is to be driven. This channel functions to laterally support the reel and maintain it in its established position within the frame. In the case of the two wheel members for the idler wheels and driving wheel, there is incorporated only a single enlarged flange at the outer edge of each wheel member to achieve the same lateral support.

The primary objective of the present invention is to construct a reel mounting apparatus wherein a plurality of reels can be mounted in a closely spaced arrangement within a frame so that a significant number of the reels could be utilized within a minimum frame width.

Another objective of the present invention is to construct a reel mounting apparatus which can be manufactured inexpensively and therefore sold on the market at an inexpensive price.

DETAILED DESCRIPTION OF THE SHOWN EMBODIMENT

Figure 1:
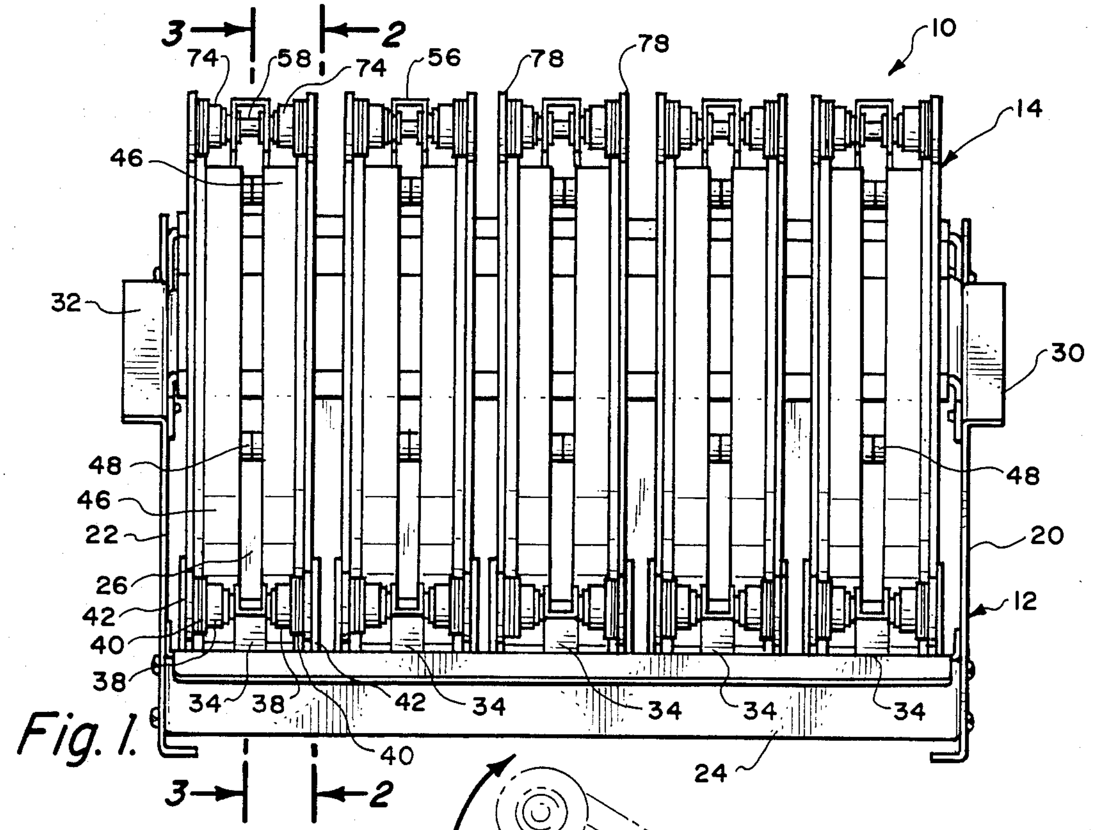
FIG. 1 is a front elevational view of the first embodiment of the reel mounting apparatus of this invention showing five in number of the reels mounted within a frame.

Referring particularly to the drawings, there is shown in FIGS. 1-5 the first embodiment 10 of this invention which is composed of a frame 12 and a plurality of reels 14. The frame 12 is formed of a sheet material base 16 which defines an internal compartment 18. Fixedly mounted to one end of the base 16 is a first side panel 20 with a second side panel 22 being fixedly mounted to the opposite end of the base 16. Fixedly mounted to the side panels 20 and 22 is a front cross member 24. The cross member 24 is of the same length from end to end as the base 16. The cross member 24 is located in close proximity to the front edge of the base 16 but is spaced slightly therefrom.

Also fixedly mounted between the side panels 20 and 22 is a lower rear cross member 26. The length of cross member 26 is also the same as the base 16. Still further, fixedly secured between the side panels 20 and 22 is an upper rear cross member 28. Still again, the length of the upper rear cross member 28 is identical to the length of the base 16 from end to end.

Sheet material side panels 20 and 22 each include protruding sections 30 and 32, respectively. The function of the protruding sections 30 and 32 are to facilitate mounting of the frame 12 within a gaming device housing (not shown).

Fixedly mounted to the front cross member 24 are a plurality of wheel support brackets 34. The wheel support brackets 34 are evenly spaced apart on the front cross member 24. In actual practice, it is expected that center line distance between the brackets 34 are to be two and one-fourth inches. The spacing between the side panel 20 and the nearest bracket 34 will be approximately one and one-eighth inches. Similar spacing occurs between the side panel 22 and its nearest bracket 34.

Rotatably mounted by shaft 36 to each of the brackets 34 are a pair of idler wheel members 38. It is to be understood that there will be a separate shaft 36 for each bracket 34. Also there will be a separate pair of wheel members 38 for each shaft 36. Normally the shaft 36 will be fixedly mounted onto its respective bracket 34 with the wheel members 38 then being low frictionally mounted to be freely rotatable on their shaft 36.

Each wheel member 38 includes an annular flattened area upon which is fixedly mounted on elastomeric band 40. Band 40 can be either as a belt or an O-ring with generally an O-ring being satisfactory.

The outer edge of wheel member 38 terminates in an enlarged annular flange 42. On each shaft 36 there is located a pair of wheel members 38 with one of the wheel members 38 being mounted on one end of the shaft 36 and the remaining wheel member 38 being mounted on the opposite end of the shaft 36. The wheel members 38 are mounted in a reverse relationship in respect to each other. The function of the flanges 42 is to provide lateral confinement or restraint for the reel 14. Actually, the only portion of the structure that supports and drives the reel 14 that protrudes laterally exteriorly of the reel 14 are the flanges 42. The reel 14 includes on its periphery a pair of spaced apart annular protuberances 44. A protuberance 44 rests against each band 40.

Reel 14 is actually constructed of two identical parts 46. Parts 46 are mounted in a reversed facing relationship with respect to each other and located so that a pair of bosses 48 line up with each other with there being a plurality of such bosses 48 in alignment. Through each aligned pair of bosses 48 is located a conventional bolt fastener 50. Bolt fastener 50 is fixedly secured in place by a conventional nut 52 and washer 54. It is to be understood that with two of the parts 46 connected together there is formed a single reel 14. Preferable material of construction for the parts 46 will be plastic.

Mounted with the ability to oscillate to the upper rear cross member 28 are a plurality of wheel support brackets 56. Fixedly mounted to the outer end of the bracket 56 is a shaft 58. The shaft 58 is basically identical to the shaft 36. Bracket 56 is basically channeled shaped forming a pair of legs through which are provided openings 60 and 62. Through the aligned opening 60 and 62 there is conducted the shaft 58. Shaft 58 is fixedly held in position within the openings 60 and 62 by means of locking tabs 64 with there being a separate locking tab for each opening 60 and 62. It is to be understood that this shaft mounting arrangement is also essentially identical for the shaft 36. Mounted on one end of the shaft 58 is a bearing sleeve 66. A similar bearing sleeve 68 is mounted on the opposite end of the shaft 58. Bearing sleeves 66 and 68 are held in position on the shaft 58 by means of a plurality of locking rings 70. Located between each sleeve 66 and 68 and its respective locking ring 70 are washers 72.

Rotatably mounted on the sleeve 66 is a wheel member 74. Each wheel member 74 includes a flattened area within which is mounted an elastomeric O-ring 76. The outer edge of the wheel member 74 terminates in an enlarged annular flange 78. Located between the flanges 78 of each pair of connected together wheel members 74 is the reel 14 with one protuberance 44 being in contact with the O-ring 76 of one wheel member 74 and the other protuberance 44 being in contact with the O-ring 76 of the other wheel member 74.

Wheel member 74, as well as the wheel members 38, are basically identical in construction. Both the wheel members 74 and 38 are to function as idler wheels which is to low frictionally support the reel 14 and permit free rotational movement of the reel 14 relative to the frame 12. Another function of the idler wheel members 38 and 74 is to confine the rotational movement of its respective reel 14.

It is to be understood that there will be five in number of the brackets 56 if there are five in number of the reels 14. In other words, there will be a bracket 56 for each reel 14 that is utilized and also there will be a bracket 34 for each reel 14.

The rear end of the bracket 56 is again channel shaped and defines a pair of aligned holes through which is conducted a pin 80. The pin 80 is fixedly mounted between a pair of upstanding flanges 82 which in turn are fixedly mounted onto a plate 84. The plate 84 is in turn fixedly mounted onto cross member 28.

Figure 2:
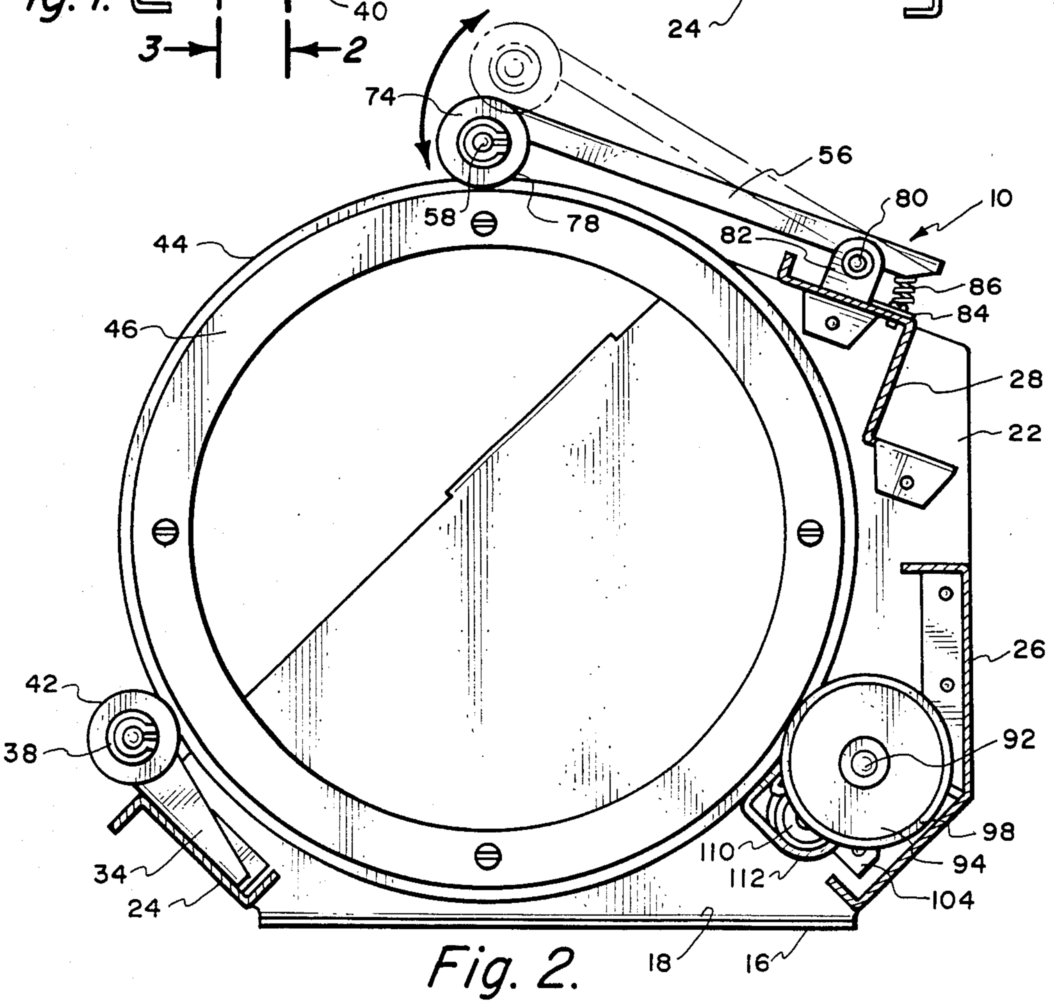
FIG. 2 is a view, partly in cross-section, taken along line 2—2 of FIG. 1 depicting the rotatable reel in side elevation.
Figure 3:
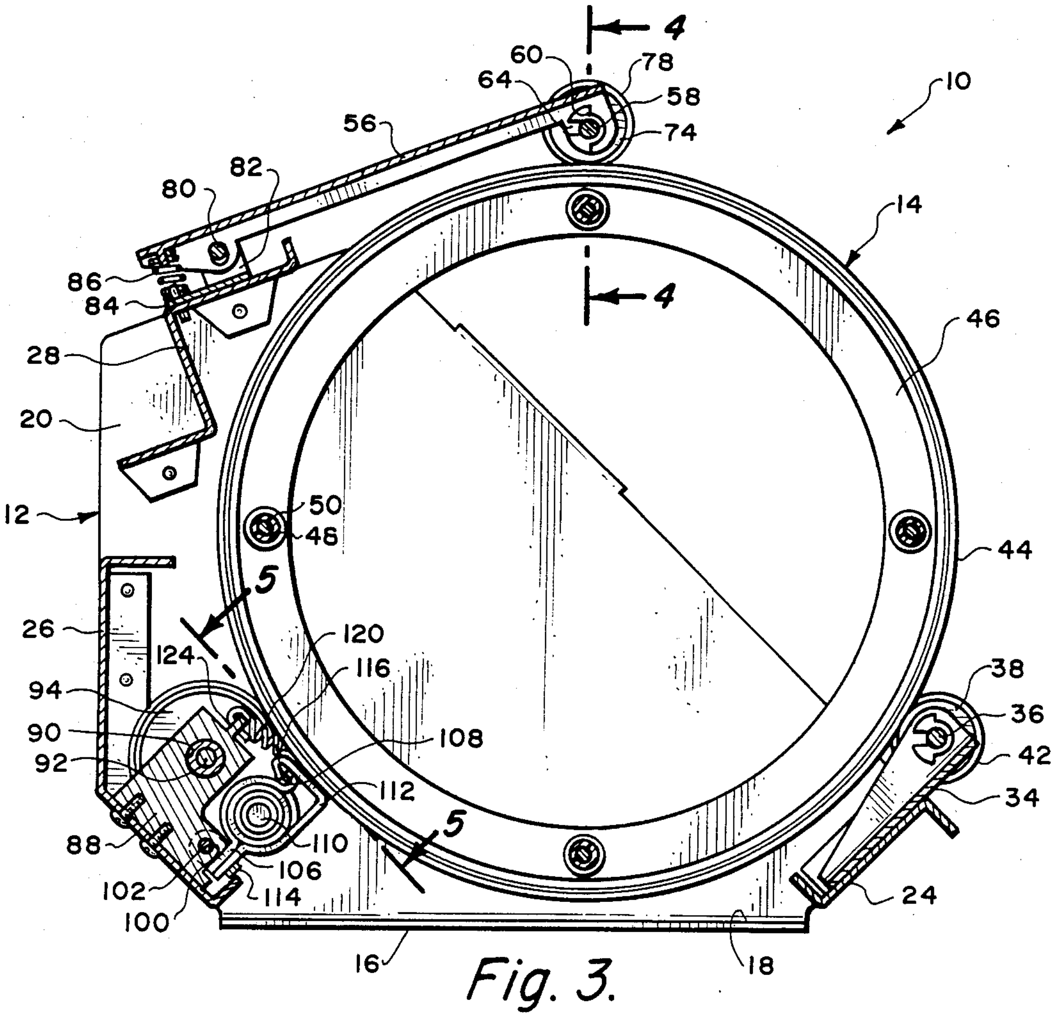
FIG. 3 is a cross-section view of the reel mounting apparatus of this invention taken along line 3—3 of FIG. 1.
Figure 4:
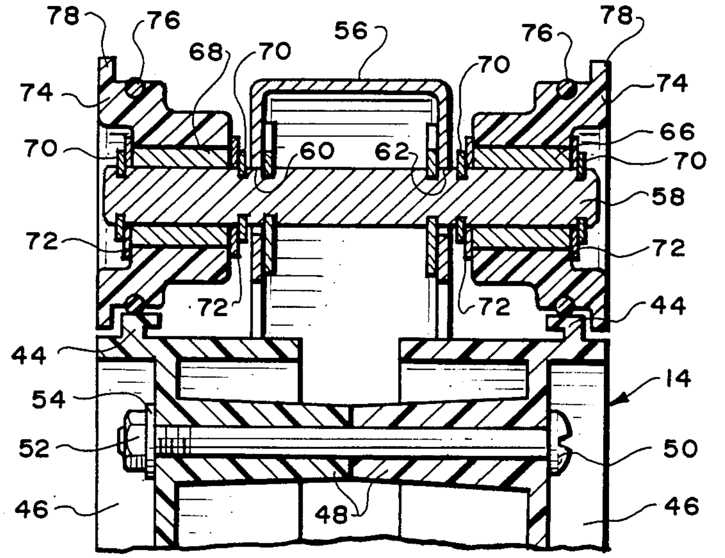
FIG. 4 is a cross-sectional view through one of the idler wheel assemblies incorporated within this invention taken along line 4—4 of FIG. 3.
Figure 5:
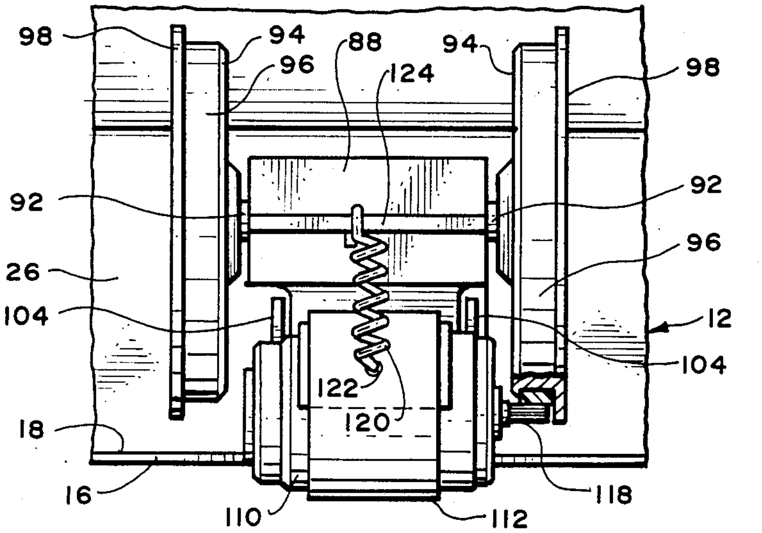
FIG. 5 is a view taken along line 5—5 of FIG. 3, showing more clearly the driving wheel assembly and the motor connected therewith.

The rearwardmost end of the bracket 56 connects with a coil spring 86. The function of the spring 86 is to exert a continuous bias against the bracket 56 tending to locate the idler wheel member 74 in the position shown in solid lines in the drawings. To facilitate insertion and removal of the reel 14, the bracket 56 can be moved to the dotted line position as shown in FIG. 2 which will permit the reel 14 to be manually removed from or installed within the compartment 18.

Fixedly mounted to the cross member 26 and extending within the compartment 18 is a support block 88. The support block 88 includes an elongated through opening 90 within which is rotatably mounted a driving wheel shaft 92. Fixedly mounted onto each end of the shaft 92 is a driving wheel member 94. Each driving wheel member 94 includes an elastomeric belt 96. It has been found that a belt is preferred over an O-ring for the driving wheel member 94. The outer edge of each of the wheels 94 includes an enlarged annular flange 98. Again, the reel 14 is to be located between the flanges 98 of the pair of driving wheel members 94 and the reel 14 will be laterally confined or restrained between the flanges 98. It is to be understood that there is to be a block 88 for each reel 14. The annular protuberance 44 of each reel 14 will be in contact with the belts 96. It is important to note that both of the driving wheel members 94 are driven together with the shaft 92.

Also formed through the block 88 is a hole 100 within which is located a pin 102. The pin 102 connects at each end with flange 104 with there being two in number of flanges 104. The flanges 104 are pivotable in respect to the pin 102. The flanges 104 are integral with motor support bracket 106 which terminates at its outer end in the U-shaped section 108. A conventional electrically operated motor 110 is to be supported against the bracket 106. The outer surface of the motor 110 is supported by cover bracket member 112. The inner end of the cover bracket 112 is fixedly secured by fastener 114 to motor bracket 106. Fastener 114 mounts to blocks. The outer end of the bracket member 112 includes a hook section 116 which connects with the U-shaped section 108.

In order to install the motor 110, the motor 110 is placed in position against the bracket 106. The operator then places the hook section 116 about U-shaped section 108 and pivots the cover member 112 to secure such by fastener 114 to the bracket member 106.

The motor 110 rotates a motor shaft 118. The shaft 118 is in continuous frictional driving arrangement with one of the belts 96 of one of the driving wheel members 94. Rotation of the shaft 118 will then result in simultaneous rotation of the driving wheel members 94 since the wheel members 94 are fixedly connected together on the shaft 92.

To insure that the shaft 118 remains in continuous engagement with its belt 96, there is utilized a coil spring 120. One end of the coil spring 120 connects with a hole 122 formed within the cover 112. The other end of the coil spring 120 connects with a hole formed within flange 124 of the support block 88.

Figure 6:
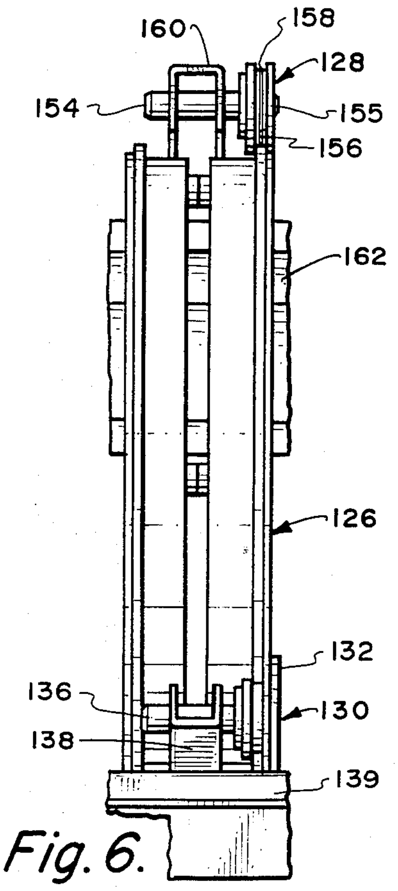
FIG. 6 is a view similar to FIG. 1, but of a second embodiment of the reel mounting apparatus of this invention.
Figure 7:
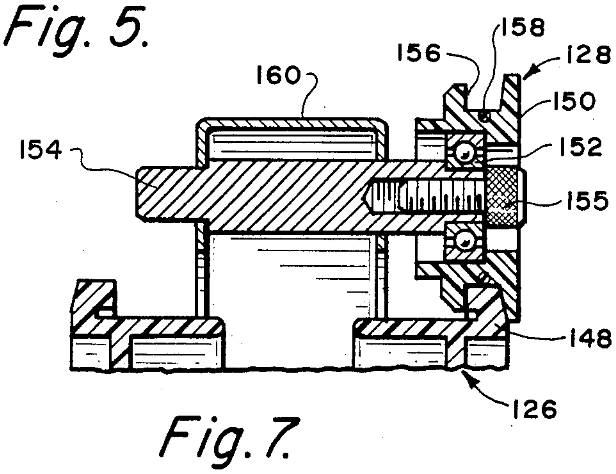
FIG. 7 is a cross-sectional view through one of the idler wheel assemblies incorporated within FIG. 6, showing in more detail the construction of same.
Figure 8:
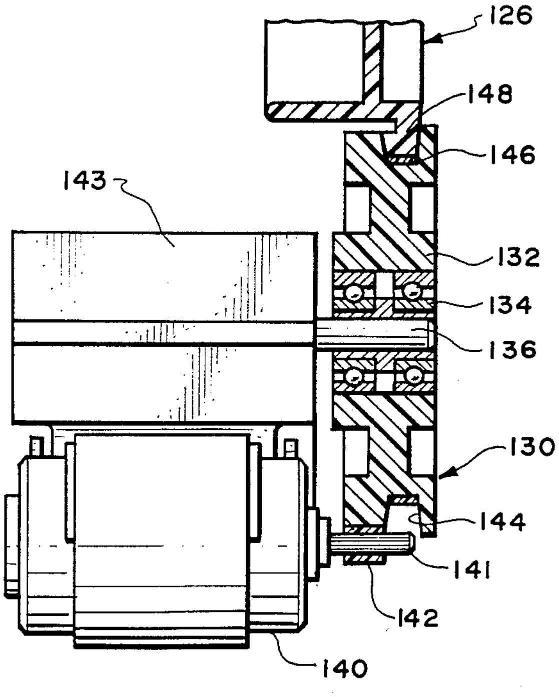
FIG. 8 is a view similar to FIG. 5, but of the motor and driving wheel arrangements incorporated within the second embodiment of FIG. 6.

Referring particularly to FIGS. 6–8 of the drawings, there is shown a modified version of the reel mounting apparatus of this invention which instead of using a dual wheel supporting structure for each wheel assembly, utilizes instead a single wheel member for each wheel assembly. It can be seen that a reel 126 is identical to reel 14. In a similar manner, the reel 126 is supported for free rotational movement by an idler wheel assembly 128 and a driving wheel assembly 130. There will be a second idler wheel assembly (not shown) utilized in conjunction with the reel 126 in a manner similar to the supporting of the reel 14.

The driving wheel assembly 130 includes a driving wheel member 132 which includes a hub bearing assembly 134. Within the hub bearing assembly 134 is fixedly mounted a shaft 136. Shaft 136 is mounted onto a bracket 138 which in turn is fixedly secured onto the lower rear cross member. Also mounted on the cross member is a support block 143, motor 140. The motor 140 is spring biasingly mounted on support block 143 utilizing a spring similar to spring 120. Motor 140 includes an output shaft 141. The shaft 141 has mounted thereon an elastomeric sleeve 142. The sleeve 142 is in continuous engagement with the driving wheel member 132. In FIG. 8 it appears that the shaft 136 protrudes from support block 143. This is not true, it only being that the position of support block 143 prevents observing of bracket 138. The driving wheel assembly 130 is in cross-section in FIG. 8 for clarity.

Within the periphery of the driving wheel member 132 is formed an annular recess 144. Within the annular recess 144 there is to be supported an elastomeric belt 146. Positioned within the recess 144 against the belt 146 is the annular protuberance 148 of the reel 126.

It can thusly be seen that by electrical operation of the motor 140, the shaft 141 is caused to rotate. Because of the continuous frictional engagement between the sleeve 142 and the driving wheel member 132, the driving wheel member 132 is rotated. This rotational movement in turn rotates the reel 126 since the annular protuberance 148 is in continuous engagement with the belt 146. It is important to note that because the recess 144 has side walls, the reel 126 is laterally restrained in the same manner as if flanges 98 were utilized in conjunction with the pair of driving wheel members 96.

Referring particularly to FIG. 7, there is shown the idler wheel assembly 128 constructed of an idler wheel member 150 which has a hub bearing assembly 152 upon which is mounted a shaft 154. The wheel member 150 is fixedly mounted on shaft 154 by threaded fastener 155. The wheel 150 includes annular recess 156 formed within the periphery of the wheel member 150. Within the recess 156 is an elastomeric O-ring 158. This O-ring is to facilitate frictional engagement with the annular protuberance 148 which rides within the recess 156. Again, because of the recess 156 having side walls, the reel 126 is laterally restrained.

The shaft 154 is mounted within a bracket 160. This bracket 160 is in turn fixedly mounted onto the front cross member 162. In observing of the drawings, and in particular FIG. 1, it can be seen that, with the exception of flanges 42, 98 and their equivalent in FIG. 6, no structure which supports and drives the reel 14 and 126 protrudes laterally exteriorly of the reel. Also, this structure is displaced outward from the periphery of the reel. This so locating of the supporting and driving mechanism permits reels 14 to be located close together thereby achieving the primary advantage of this invention of obtaining a narrow width gaming device.

What is claimed is:

1. A reel mounting apparatus comprising:

a frame;

wheel assembly members being mounted on said frame, said wheel assembly members being low frictionally rotatable, said wheel assembly members including a plurality of driving wheels, each said driving wheel being rotatably driven by a motor with therebeing a separate said motor for each said driving wheel, said wheel assembly members also including a plurality of pairs of idler wheels, said idler wheels being spaced apart;

a plurality of reels, said reels being located in a closely spaced side-by-side arrangement, each said reel having a peripheral surface, each said peripheral surface being adapted to support a structure to be visually observed, each said reel being supported by a said pair of said idler wheels and a said driving wheel, each said reel capable of being freely rotated relative to said frame, whereby activation of said motor causes its respective said reel to rotate within said frame; and said wheel assembly members for each said reel being located exteriorly of their respective said peripheral surface, said wheel assembly members being located substantially entirely within the width dimension of their respective said reel, whereby a plurality of said reels are mounted together minimizing the overall width of said reel mounting apparatus.

2. The reel mounting apparatus as defined in claim 1 wherein:

at least one of said idler wheels for each said reel being spring biased toward said reel maintaining firm connection of said idler wheels and said driving wheel with said reel.

3. The reel mounting apparatus as defined in claim 2 wherein:

each said motor having an output shaft, each said output shaft connecting with a said driving wheel, each said motor being mounted by spring means to said frame, said spring means functioning to maintain continuous firm connection of each said output shaft with its respective said driving wheel.

4. The reel mounting apparatus as defined in claim 3 wherein:

each said driving wheel including a resilient band, each said idler wheel including a resilient band.

5. A reel mounting apparatus comprising:

a frame;

wheel assembly members being mounted on said frame, said wheel assembly members being low frictionally rotatable, said wheel assembly members including a driving wheel, said driving wheel being rotatably driven by a motor, said wheel assembly members also including at least a pair of idler wheels, said idler wheels being spaced apart;

a reel having a peripheral surface, said peripheral surface being adapted to support a structure to be visually observed, said reel being supported by said wheel assembly members and capable of being freely rotated relative to said frame, whereby activation of said motor causes said reel to rotate within said frame;

at least one of said idler wheels being spring biased toward said reel maintaining firm connection of said idler wheels and said driving wheel with said reel;

said motor having an output shaft, said output shaft connecting with said driving wheel, said motor being mounted by spring means to said frame, said spring means functioning to maintain continuous firm connection of said shaft with said driving wheel;

said driving wheel including a resilient band, each said idler wheel including a resilient band;

said reel being constructed of two separate identical parts mounted together in a reversed facing relationship; and said driving wheel comprising a pair of wheel members connected together through a connecting shaft, each said wheel member being in frictional driving contact with said reel.

6. A reel mounting apparatus comprising:

a frame;

wheel assembly members being mounted on said frame, said wheel assembly members being low frictionally rotatable, said wheel assembly members including a driving wheel, said driving wheel being rotatably driven by a motor, said wheel assembly members also including at least a pair of idler wheels, said idler wheels being spaced apart;

a reel having a peripheral surface, said peripheral surface being adapted to support a structure to be visually observed, said reel being supported by said wheel assembly members and capable of being freely rotated relative to said frame, whereby activation of said motor causes said reel to rotate within said frame;

said wheel assembly members being located exteriorly of said peripheral surface, said wheel assembly members and said motor being located substantially entirely within the width dimension of said reel, whereby a plurality of said reels can be arranged side-by-side in a closely spaced manner thereby minimizing the overall width of said reel mounting apparatus; and said reel being constructed of two separate identical parts mounted together in a reversed facing relationship.

* * * * *